(12) United States Patent
Watanabe et al.

(10) Patent No.: US 7,860,321 B2
(45) Date of Patent: Dec. 28, 2010

(54) IMAGE PICKUP APPARATUS WITH FUNCTION OF RATE CONVERSION PROCESSING AND CONTROL METHOD THEREFOR

(75) Inventors: Yoshinori Watanabe, Tokyo (JP); Hideyuki Rengakuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1498 days.

(21) Appl. No.: 11/231,838

(22) Filed: Sep. 21, 2005

(65) Prior Publication Data

US 2006/0114334 A1 Jun. 1, 2006

(30) Foreign Application Priority Data

Sep. 21, 2004 (JP) .............................. 2004-273564

(51) Int. Cl.
*G06K 9/36* (2006.01)
*H04N 7/01* (2006.01)
(52) U.S. Cl. .................. 382/232; 348/443; 348/446; 348/459; 386/5; 386/6
(58) Field of Classification Search ............... 382/232, 382/236; 386/5, 6; 348/441, 443, 446, 454, 348/459
See application file for complete search history.

(56) References Cited

U.S. PATENT DOCUMENTS

| | | | | |
|---|---|---|---|---|
| 3,663,749 | A * | 5/1972 | Cannon ............... | 375/240.21 |
| 3,855,424 | A * | 12/1974 | Tharmaratnam et al. .... | 704/258 |
| 4,543,607 | A * | 9/1985 | Taylor et al. ............... | 348/459 |
| 5,355,169 | A * | 10/1994 | Richards et al. ............. | 348/459 |
| 5,517,248 | A * | 5/1996 | Isoda ........................ | 348/459 |
| 5,754,248 | A * | 5/1998 | Faroudja .................... | 348/474 |
| 5,805,207 | A * | 9/1998 | Watkinson et al. ........... | 348/97 |
| 5,956,454 | A * | 9/1999 | Shinohara et al. ............ | 386/68 |
| 6,009,236 | A * | 12/1999 | Mishima et al. ............. | 386/111 |
| 6,157,739 | A * | 12/2000 | Yazawa et al. .............. | 382/233 |
| 6,222,589 | B1 * | 4/2001 | Faroudja et al. ............. | 348/448 |
| 6,356,708 | B1 * | 3/2002 | Krause et al. ............... | 386/109 |
| 6,370,198 | B1 * | 4/2002 | Washino ................ | 375/240.26 |
| 6,445,419 | B1 * | 9/2002 | Sanpei ....................... | 348/443 |
| 6,614,846 | B1 * | 9/2003 | Fujiwara et al. ........ | 375/240.16 |
| 6,816,552 | B2 * | 11/2004 | Demos .................. | 375/240.15 |

(Continued)

FOREIGN PATENT DOCUMENTS

JP 2003-299038 A 10/2003

(Continued)

OTHER PUBLICATIONS

The above references were cited in a May 26, 2009 Japanese Office Action that issued in Japanese Patent Application No. 2004-273564.

*Primary Examiner*—Bhavesh M Mehta
*Assistant Examiner*—Anthony Mackowey
(74) *Attorney, Agent, or Firm*—Cowan, Liebowitz & Latman, P.C.

(57) ABSTRACT

A rate conversion unit determines a frame thinning-out rate to thin out frames on the basis of a recording rate at the time of photographing and a display rate for display on a display apparatus so that a temporal updating interval of a video image between continuous fields becomes constant. After that, a frame is repeatedly inserted so that a frame rate becomes equal to the display rate.

12 Claims, 11 Drawing Sheets

U.S. PATENT DOCUMENTS

| | | | |
|---|---|---|---|
| 6,842,735 B1* | 1/2005 | Covell et al. | 704/503 |
| 6,900,845 B1* | 5/2005 | Christopher et al. | 348/445 |
| 6,999,103 B2* | 2/2006 | Matsumoto et al. | 345/620 |
| 7,068,916 B2* | 6/2006 | Brandsma | 386/68 |
| 7,099,564 B2* | 8/2006 | Higashimura et al. | 386/95 |
| 7,206,025 B2* | 4/2007 | Choi | 348/441 |
| 7,206,026 B2* | 4/2007 | Hsiung et al. | 348/441 |
| 7,266,150 B2* | 9/2007 | Demos | 375/240.15 |
| 7,298,417 B2* | 11/2007 | Sakaniwa et al. | 348/441 |
| 7,349,029 B1* | 3/2008 | Chou | 348/448 |
| 7,411,617 B2* | 8/2008 | Kume et al. | 348/239 |
| 7,421,027 B2* | 9/2008 | Yamaguchi et al. | 375/240.26 |
| 7,474,696 B2* | 1/2009 | Washino | 375/240.01 |
| 7,535,448 B2* | 5/2009 | Hiroki | 345/89 |
| 7,580,463 B2* | 8/2009 | Routhier et al. | 375/240.25 |
| 7,596,297 B2* | 9/2009 | Kato | 386/68 |
| 7,773,123 B2* | 8/2010 | Kaneko et al. | 348/222.1 |
| 2002/0035724 A1* | 3/2002 | Wise | 725/1 |
| 2002/0118296 A1* | 8/2002 | Schwab et al. | 348/441 |
| 2003/0063259 A1* | 4/2003 | Huber | 352/44 |
| 2003/0219238 A1 | 11/2003 | Yamaguchi et al. | |
| 2004/0071211 A1* | 4/2004 | Washino | 375/240.01 |
| 2004/0081437 A1* | 4/2004 | Asada et al. | 386/131 |
| 2004/0090554 A1* | 5/2004 | Nishi | 348/441 |
| 2004/0131122 A1* | 7/2004 | Kudo | 375/240.16 |
| 2004/0170330 A1* | 9/2004 | Fogg | 382/232 |
| 2005/0116880 A1* | 6/2005 | Flanigan | 345/3.2 |
| 2005/0158025 A1* | 7/2005 | Shinkai | 386/68 |
| 2005/0232597 A1* | 10/2005 | Shimazaki et al. | 386/95 |
| 2006/0007346 A1* | 1/2006 | Nakamura et al. | 348/362 |
| 2006/0147187 A1* | 7/2006 | Takemoto et al. | 386/117 |
| 2007/0041444 A1* | 2/2007 | Gutierrez | 375/240.15 |
| 2007/0296857 A1* | 12/2007 | Lee | 348/452 |

FOREIGN PATENT DOCUMENTS

| | | | |
|---|---|---|---|
| JP | 2004048530 A | * | 2/2004 |
| JP | 2004-180289 A | | 6/2004 |
| JP | 2004-221955 A | | 8/2004 |
| WO | WO 9807274 A1 | * | 2/1998 |

* cited by examiner

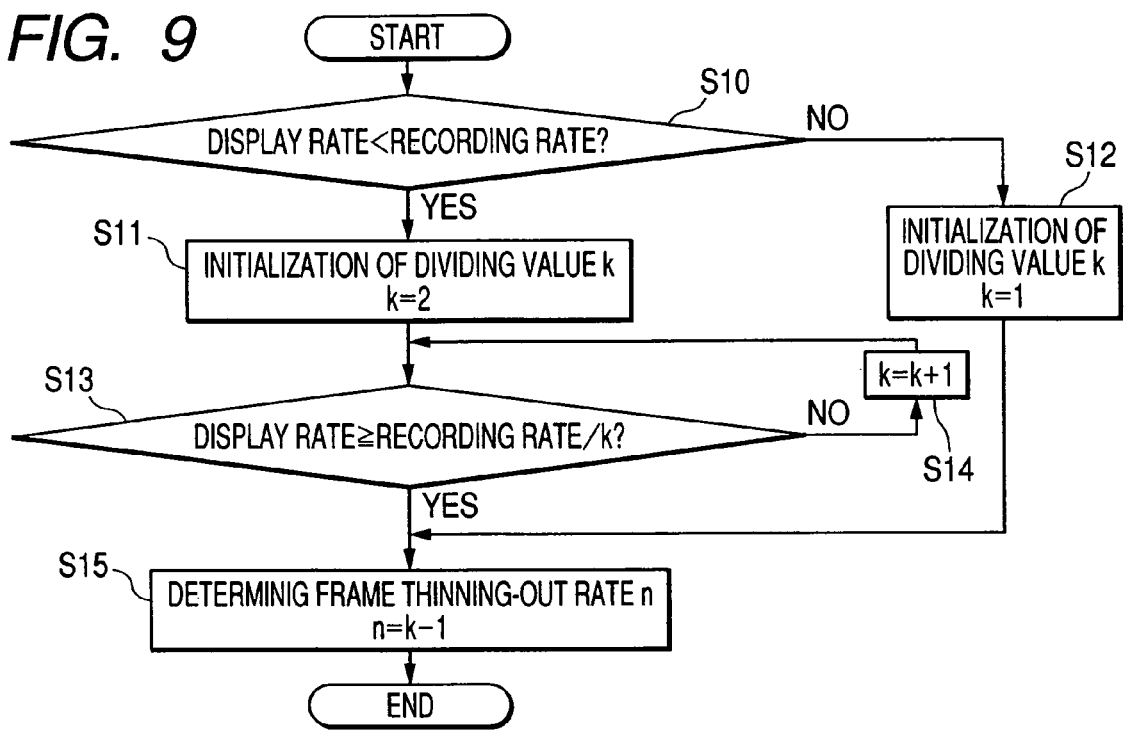
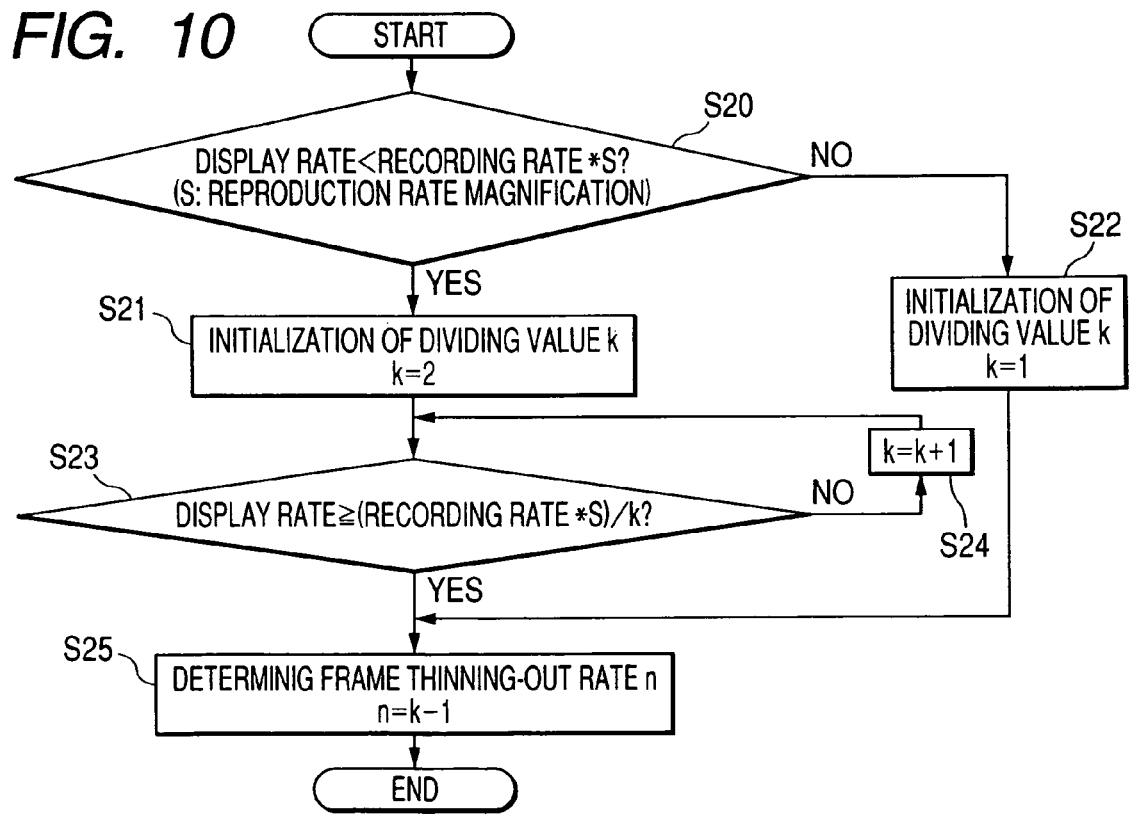

IMAGE PICKUP APPARATUS WITH FUNCTION OF RATE CONVERSION PROCESSING AND CONTROL METHOD THEREFOR

BACKGROUND OF THE INVENTION

1. Field of the Invention

The present invention relates to an image pickup apparatus having a function of rate conversion processing to deal with the case where a frame rate of recording and a frame rate of reproduction differ from each other, and a control method therefor.

2. Related Background Art

When image data is recorded by an image pickup apparatus capable of switching between NTSC and PAL to reproduce of image data, a frame rate of image data to be recorded differs from a display type of a display apparatus in some cases.

In order to solve this problem, a technique of converting a frame rate is disclosed in Japanese Patent Application Laid-open No. 2004-80327 and Japanese Patent Application Laid-open No. 2004-48530.

For example, Japanese Patent Application Laid-open No. 2004-80327 discloses a method of performing frame rate conversion processing using thinning-out to output image data in conformity with a display rate when a frame rate of image data to be recorded differs from that during reproduction. In this method, for example, if image data recorded in the NTSC (60 fps) standard is to be displayed in the PAL (50 fps) standard, one image is thinned out from every six images to achieve frame rate conversion as shown in FIG. 3.

According to such a conventional method, however, sudden frame dropping occurs. Therefore, there is a problem that the reproduction of a moving image seems to be unnatural.

Moreover, Japanese Patent Application Laid-open No. 2004-48530 discloses a method of weighting two adjacent frames on the basis of an image and assigning evaluation values to all the frames to suppress the unnaturalness caused by the frame dropping. Base on the evaluation values, a frame to be thinned out is selected.

In order to carry out such a conventional method, however, it is necessary to temporarily store a plurality of frames to determine a frame to be thinned out. Accordingly, a large-capacity memory is required. Furthermore, since arithmetic processing for selecting the frame to be thinned out is required, this method is disadvantageous in that delay time from the readout of image data to image display is prolonged. If the delay time is prolonged in this manner, the method is not suitable for displaying images on a view finder during photographing.

SUMMARY OF THE INVENTION

The present invention has an object to solve the problems as described above.

The present invention has another object to provide an image pickup apparatus capable of reducing unnaturalness caused by rate conversion during image display, without performing complex arithmetic processing, and a control method therefor.

To achieve the above objects, according to an aspect of the present invention, an image pickup apparatus of the present invention comprises: image pickup means for picking up an object image; recording-means for recording image data obtained by the image pickup means onto a recording medium; display means for selectively displaying an image related to any one of the image data obtained by the image pickup means and the image data recorded on the recording medium on a display apparatus; thinning-out rate determination means for determining a thinning-out rate for the image to be displayed by the display means on the basis of a rate at the time of photographing of the image to be displayed by the display means and a display rate in the display apparatus; image thinning-out means for performing thinning-out processing on the image to be displayed by the display means on the basis of the thinning-out rate determined by the thinning-out determination means; and rate conversion means for inserting repeatedly output images to the image thinned out by the image thinning-out means to increase a rate so that the rate of the image thinned out by the image thinning-out means is made equal to the display rate in the display apparatus.

Also, according to another aspect of the present invention, a method of controlling an image pickup apparatus of the present invention including image pickup means for picking up an object image, recording means for recording image data obtained by the image pickup means onto a recording medium, and display means for selectively displaying any one of the image photographed by the image pickup means and the image recorded onto the recording medium on a display apparatus, the method comprising: a thinning-out rate determination step of determining a thinning-out rate for the image to be displayed by the display means on the basis of a rate at the time of photographing of the image displayed by the display means and a display rate in the display apparatus; an image thinning-out step of performing thinning-out processing on the image to be displayed by the display means on the basis of the thinning-out rate determined in the thinning-out rate determination step; a rate conversion step of inserting repeatedly output images to the image thinned out in the image thinning-out step to increase a rate so that the rate of the image thinned out in the image thinning-out step is made equal to the display rate in the display apparatus; and a display step of displaying the image whose rate is converted in the rate conversion step on the display apparatus.

The objects and characteristics of the present invention other than those described above will be more apparent from the detailed description of embodiments of the present invention with reference to the following drawings.

BRIEF DESCRIPTION OF THE DRAWINGS

FIG. 9 is a flowchart showing an operation (algorithm) of a frame rate conversion control unit 36 in the first embodiment;

FIG. 10 is a flowchart showing an operation of the frame rate conversion control unit 36 in the second embodiment;

DESCRIPTION OF THE PREFERRED EMBODIMENTS

Hereinafter, embodiments of the present invention will be described in detail with reference to the accompanying drawings.

First Embodiment

Figure 1:
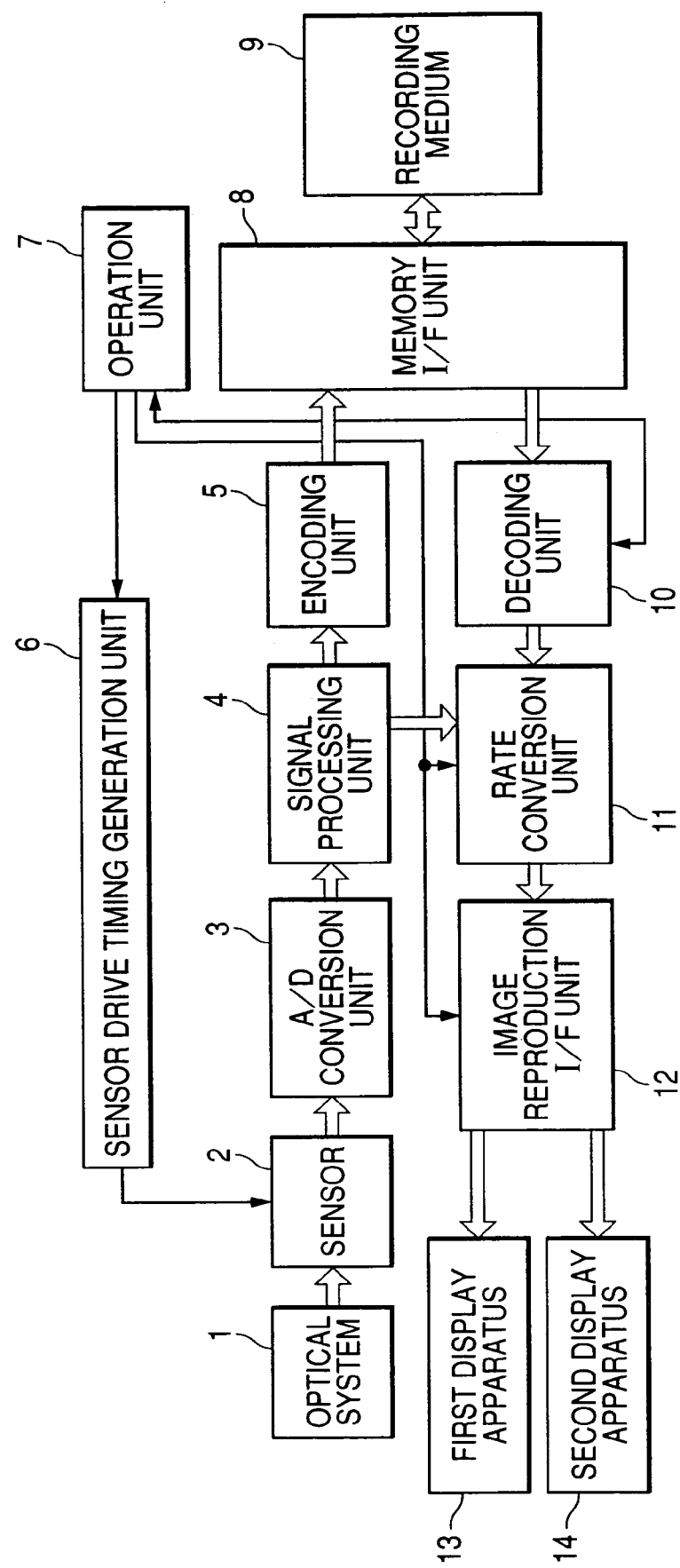
FIG. 1 is a block diagram showing a configuration of an image pickup apparatus according to a first embodiment of the present invention.

First, a first embodiment of the present invention will be described. FIG. 1 is a block diagram showing a configuration of an image pickup apparatus according to the first embodiment of the present invention.

The image pickup apparatus according to this embodiment includes: an optical system 1; a sensor 2; an A/D conversion unit 3; a signal processing unit 4; an encoding unit 5; a sensor drive-timing generation unit 6; an operation unit 7; a memory I/F unit 8; a recording medium 9; a decoding unit 10; a rate conversion unit 11; and an image reproduction I/F unit 12. A first display apparatus 13 and a second display apparatus 14 are connected to the image pickup apparatus.

The optical system 1 includes of, for example, an optical lens for imaging object light. The sensor 2 converts the object light imaged by the optical system 1 into an analog image signal to output it. The A/D conversion unit 3 converts the analog image signal output from the sensor 2 into a digital signal to output it. The signal processing unit 4 performs color difference matrix conversion processing on the image data (the digital signal) output from the A/D conversion unit 3 to generate a color difference signal and a luminance signal, which are further subjected to signal processing such as aperture correction and gamma correction to be output. The encoding unit 5 compresses the color difference signal and the luminance signal output from the signal processing unit 4 into compressed data in a JPEG or MPEG format or the like. At this time, the encoding unit 5 inserts a recording frame rate as header information into the compressed data. The memory I/F unit 8 writes the compressed image data output from the encoding unit 5 onto the recording medium 9 during image recording. On the other hand, during image reproduction, the memory I/F unit 8 reads out the compressed image data recorded on the recording medium 9 to output it to the decoding unit 10. The decoding unit 10 expands the compressed image data read out by the memory I/F unit 8 during the image reproduction to output the expanded image data. The rate conversion unit 11 performs frame thinning-out processing or frame rate conversion processing on the basis of a frame rate or the like of the image data output from the decoding unit 10 to convert the rate so as to be in conformity with a display rate of the first display apparatus 13 or the second display apparatus 14. The details of the rate conversion unit 11 will be described below with reference to FIG. 2. The image reproduction I/F unit 12 performs the addition of a synchronizing signal, D/A conversion processing, gain adjustment, and the like on the image data output from the rate conversion unit 11 in accordance with the input format of the first display apparatus 13 or the second display apparatus 14 to output an image signal to the first display apparatus 13 or the second display apparatus 14. The first display apparatus 13 is, for example, a PAL system monitor (a display rate: 50 fps), whereas the second display apparatus 14 is, for example, a removable liquid crystal display (LCD) capable of switching its display rate between 50 fps and 60 fps (59.94 fps).

The operation unit 7 controls an operation of the sensor drive timing generation unit 6 so that the sensor drive timing generation unit 6 switches a drive cycle of a timing signal for driving the sensor 2. By such control, an image can be recorded at the recording rate set in the operation unit 7. Moreover, the operation unit 7 outputs a control signal to the image reproduction I/F unit 12 and the rate conversion unit 11 on the basis of frame rate information of the image data and the like output from the decoding unit 10 during the image reproduction, so that the image reproduction I/F unit 12 and the rate conversion unit 11 switch an image signal output display rate. By such control, the image can be output and displayed at the display rate set in the operation unit 7.

Figure 2:
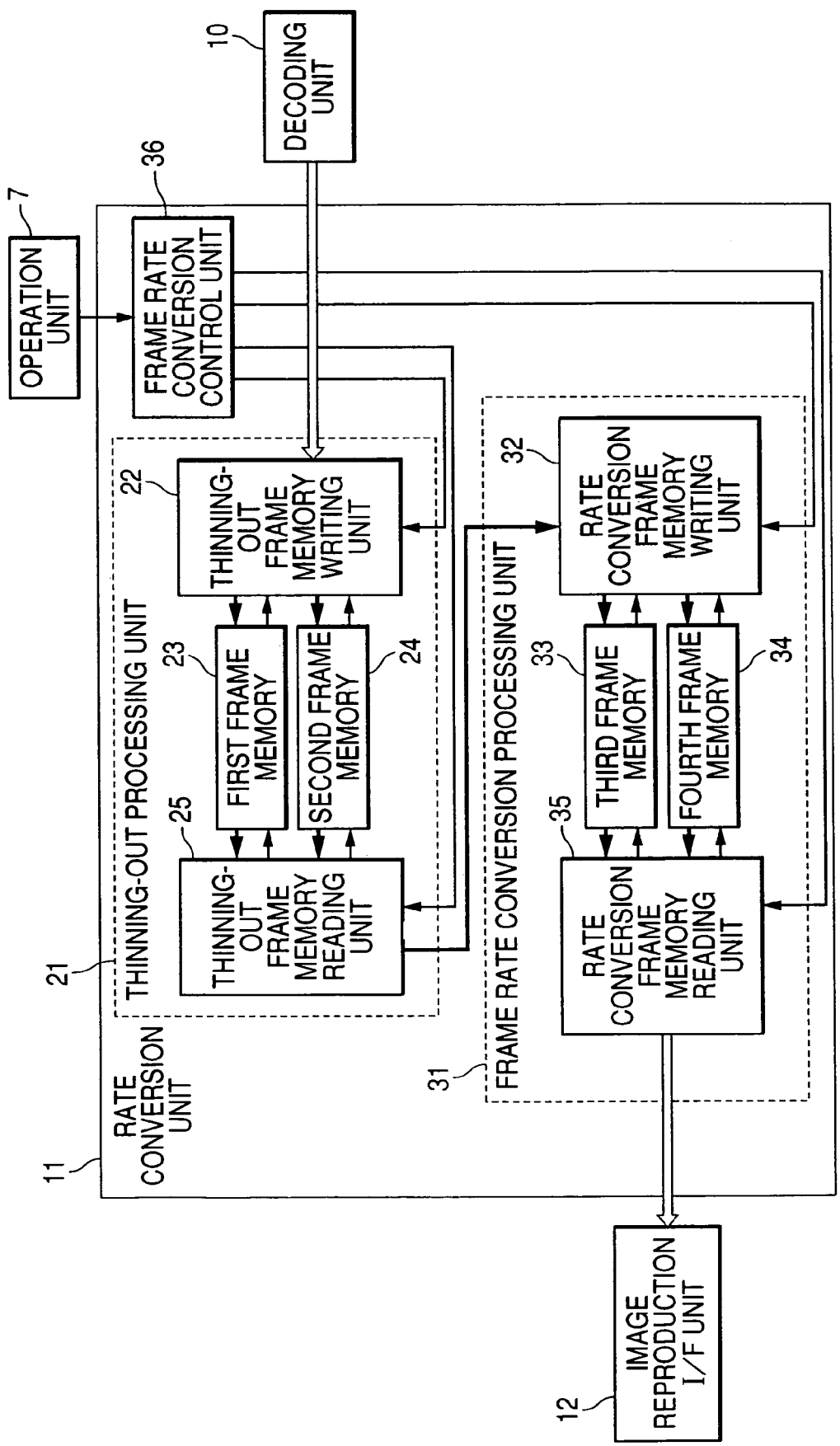
FIG. 2 is a block diagram showing a rate conversion unit 11.

The rate conversion unit 11 will now be described. FIG. 2 is a block diagram showing a configuration of the rate conversion unit 11. The rate conversion unit 11 includes: a thinning-out processing unit 21; a frame rate conversion processing unit 31; and a frame rate conversion control unit 36. The thinning-out processing unit 21 includes: a first frame memory 23; a second frame memory 24; a thinning-out frame memory writing unit 22; and a thinning-out frame memory reading unit 25. The frame rate conversion processing unit 31 includes: a third frame memory 33; a fourth frame memory 34; a rate conversion frame memory writing unit 32; and a rate conversion frame memory reading unit 35. Each of the thinning-out frame memory writing unit 22, the thinning-out frame memory reading unit 25, the rate conversion frame memory writing unit 32, and the rate conversion frame memory reading unit 35 is independently controlled by a control signal from the frame rate conversion control unit 36. The frame rate conversion control unit 36 determines a frame thinning-out rate n in accordance with an algorithm shown in FIG. 9 on the basis of the control signal from the operation unit 7 to output a control signal.

An operation of the frame rate conversion control unit 36 will now be described with reference to FIG. 9.

The frame rate conversion control unit 36 compares the recording rate and the display rate set in the operation unit 7 with each other (step S10). If the recording rate is higher than the display rate, a dividing value k is initialized to 2 (step S11). After that, the dividing value k is incremented one by one until the display rate becomes higher than the recording rate divided by the dividing value k (steps S13 and S14).

Then, at the step S13, if the display rate is equal to or higher than the recording rate obtained by k-division, that is, if the dividing value k of the recording rate, with which the display rate becomes equal to or higher than the recording rate, is obtained, the frame thinning-out rate n is determined to be "k−1" (step S15) Specifically, if the recording rate set in the operation unit 7 is higher than the set display rate, the dividing value k is set so that the recording rate obtained by k-division becomes lower than and closest to the display rate. On the basis of the dividing value k, the frame thinning-out rate n is determined.

On the other hand, if the result of determination at the step S10 shows that the recording rate is equal to or lower than the display rate, the dividing value k is initialized to 1 (step S12). Subsequently, the processing at the step S15 is performed. In this case, however, the dividing value is 1. Therefore, the frame thinning-out rate n becomes 0. Accordingly, if the recording rate is equal to or lower than the display rate, the rate conversion unit 11 outputs the image data without performing the thinning-out processing.

In the above-described manner, the frame rate conversion control unit 36 determines the frame thinning-out rate n on the basis of the recording rate and the display rate set in the operation unit 7. On the basis of the frame thinning-out rate n, the rate conversion unit 11 performs the thinning-out processing. The thinning-out processing will be described below.

Next, operation in recording and reproduction of the image pickup apparatus according to this embodiment will be described with reference to FIGS. 1 and 2. Since the thinning-out processing is not performed if the recording rate is equal to or lower than the display rate as described above, the operation when the display rate is lower than the recording rate will be described herein.

Operation in Recording

Herein, as an example of the case where the display rate is lower than the recording rate, an operation in recording when the recording rate is 60 fps and the display rate is 50 fps will be described.

First, an operation of recording an image signal will be described.

A user first sets the recording rate to 60 fps in the operation unit 7. As a result, the sensor drive timing generation unit 6 outputs a drive signal to the sensor 2 so as to load the image signal at a rate of 60 fps. Then, if the start of image pickup is instructed after the setting described above, an object image is imaged through the optical system 1. After the imaged object image is converted into an analog image signal at a rate of 60 fps by an image pickup element in the sensor 2, the analog image signal is loaded. The obtained analog image signal is converted into a digital signal by the A/D conversion unit 3. After that, as a result of the color difference matrix conversion processing by the signal processing unit 4, the digital signal is converted into a color difference signal and a luminance signal, which are further subjected to signal processing such as aperture correction and gamma correction. Furthermore, the color difference signal and the luminance signal are compressed by the encoding unit 5 into compressed data of a JPEG or MPEG format or the like. At the same time, the frame rate of recording, 60 fps, is added to the compressed data as header information. The compressed data is recorded onto the recording medium 9 through the memory I/F unit 8.

A view finder display operation of the first display apparatus 13 during recording will now be described.

First, the user sets, in the operation unit 7, the recording rate to 60 fps and the display rate to 50 fps in accordance with the display rate of the first display apparatus 13 (for example, the PAL system monitor) or the second display apparatus 14 (for example, the LCD). As a result, the sensor drive timing generation unit 6 outputs the drive signal to the sensor 2 so as to load the image signal at a rate of 60 fps. The control signal is output from the operation unit 7 to the image reproduction I/F unit 12 and the rate conversion unit 11, so that the image data is output at a display rate of 50 fps at the time of view finder display. Then, if the start of photographing is instructed after the setting described above, the compressed data is recorded onto the recording medium 9 as in the above-described manner. At the same time, the following display processing is performed in parallel to the above processing.

When the processing by the signal processing unit 4 is completed, the image data output from the signal processing unit 4 is received by the rate conversion unit 11 for view finder display. Then, the rate conversion unit 11 performs frame rate conversion processing as follows on the basis of the display rate and the recording rate set in the operation unit 7. Specifically, first, the frame rate conversion control unit 36 determines the frame thinning-out rate n in accordance with the algorithm shown in FIG. 9 so that a temporal updating interval of a video image between continuous fields becomes constant. Then, the control signal is output. In this example, the recording rate is set to 60 fps and the display rate is set to 50 fps, and therefore, the recording rate (60 fps) is higher than the display rate (50 fps). Thus, the frame rate conversion control unit 36 initializes the dividing value k to 2 (the steps S10 and S11). After that, the dividing value k is incremented one by one until the display rate becomes higher than the recording rate obtained by k-division (the steps S13 and S14). Since "display rate (50 fps)≧recording rate (60 fps)/k" is established when the dividing value k is 2 in this example, the dividing value k is 2. Subsequently, the frame rate conversion control unit 36 sets "k−1=1" as the frame thinning-out rate n (the step S15). As a result, the frame rate conversion control unit 36 outputs the control signal so as to thin out one frame for each time.

Figure 3:
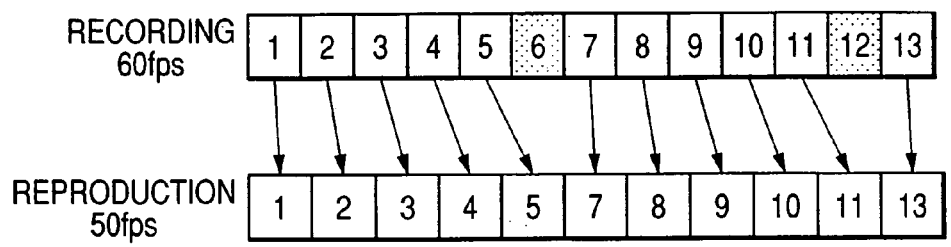
FIG. 3 is a diagram showing conventional rate conversion processing.

Herein, an update period of the image data recorded at the recording rate of 60 fps is 1/60=about 16.7 msec, and an update period of the image data reproduced at the display rate of 50 fps is 1/50=about 20 msec. Accordingly, if the thinning-out processing is performed so that one frame is thinned out from every 6 frames as in the conventional thinning-out processing shown in FIG. 3, there are two temporal updating intervals of a video image between continuous fields, i.e., about 16.7 msec and about 33.3 msec. Since the temporal updating interval is not constant in the conventional method, unnaturalness appears in image reproduction. On the other hand, in this embodiment, the frame rate conversion control unit 36 performs thinning-out at a half rate (corresponding to 30 fps). Therefore, the temporal updating interval can be set constant. As a result, the temporal updating interval of the video image between continuous fields after thinning-out becomes constant, about 33.3 msec.

Figure 4:
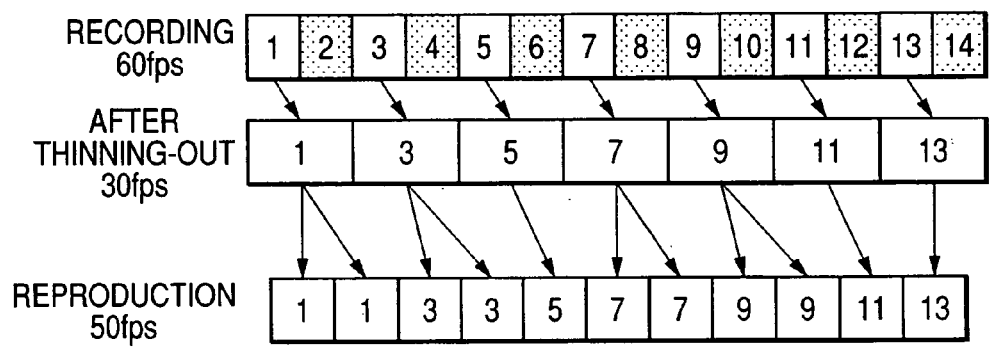
FIG. 4 is a diagram showing rate conversion processing in the first embodiment of the present invention.

FIG. 4 is a diagram showing rate conversion processing when the recording rate is 60 fps and the display rate is 50 fps. With reference to FIGS. 2 and 4, an operation of the rate conversion unit 11 will be described.

First, in the thinning-out processing unit 21, the thinning-out frame memory writing unit 22 writes the image data output from the signal processing unit 4 alternately in the first frame memory 23 and the second frame memory 24 on the basis of the control signal from the frame rate conversion control unit 36. For example, in FIG. 4, odd-numbered frames 1, 3, 5, 7, and so on are written into the first frame memory 23, whereas even-numbered frames 2, 4, 6, 8 and so on are written into the second frame memory 24.

Next, the thinning-out frame memory reading unit 25 reads the frame data only from the first frame memory 23 on the basis of the control signal from the frame rate conversion control unit 36. As a result, the frame rate of the image data after thinning-out becomes 30 fps, which is lower than the display rate.

Subsequently, the number of repeated display is determined for each frame in the frame rate conversion processing unit 31 to convert the image data at 30 fps after thinning-out into 50 fps corresponding to the display rate of the first display apparatus. Specifically, first, the rate conversion frame memory writing unit 32 writes the frame data output from the thinning-out processing unit 21 (the thinning-out frame memory reading unit 25) alternately into the third frame memory 33 and the fourth frame memory 34. Specifically, in the example shown in FIG. 4, the frames 1, 5, 9 and so on are written into the third frame memory 33, whereas the frames 3, 7, 11 and so on are written into the fourth frame memory 34.

After that, the rate conversion frame reading unit 35 repeats the following readout on the basis of the control signal from the frame rate conversion control unit 36; reading out twice from the third frame memory 33, reading out twice from the fourth frame memory 34, reading out once from the third frame memory 33, reading out twice from the fourth frame memory 34, reading out twice from the third frame memory 33 and reading out once from the fourth frame memory 34. As a result, as shown in FIG. 4, three frames are read out twice, twice, and once, i.e., in total, five times in such a manner that a frame 1 is read out twice, a frame 3 twice, and a frame 5 once. Therefore, the rate of the image data, 30 fps, is converted into 50 fps. Then, the image data whose rate is converted into 50 fps is output to the image reproduction I/F unit 12 to be displayed on the first display apparatus 13.

In the above-described manner, during the view finder display operation of the first display apparatus 13, the image reproduction I/F unit 12 and the rate conversion unit 11 are controlled so as to output the image signal at the display rate of 50 fps.

During recording, the picked-up image can be displayed on the second display apparatus 14. As described above, the second display apparatus 14 is, for example, an LCD capable of switching its display rate between 60 fps and 50 fps. Therefore, if the recording rate is set to 60 fps in the operation unit 7 as described above, a display rate control signal for 60 fps is sent together with the image data from the image reproduction I/F unit 12 to the second display apparatus 14. As a result, the second display apparatus 14 displays an image at the display rate of 60 fps.

Operation in Reproduction

Herein, as an example of the case where the display rate is lower than the recording rate, an operation during reproduction when the recording rate is 60 fps and the display rate is 50 fps will be described.

First, the user sets the display rate to 50 fps in accordance with the display rate of the first display apparatus 13 (for example, the PAL system monitor) or the second display apparatus 14 (for example, the LCD) in the operation unit 7. As a result, the control signal is output from the operation unit 7 to the image reproduction I/F unit 12 and the rate conversion unit 11, so that the image data is output at the display rate of 50 fps during image reproduction. Then, if the start of image reproduction is instructed after the setting as described above, the compressed data is read from the recording medium 9 through the memory I/F unit 8. At the same time, the recording rate (60 fps), which is added to the compressed data as header information, is also read. After expanding the read compressed image data, the decoding unit 10 outputs the image data and the recording rate to the rate conversion unit 11.

The rate conversion unit 11 performs frame rate conversion processing as follows on the basis of the recording rate and the control signal from the operation unit 7. Specifically, first, the frame rate conversion control unit 36 determines the frame thinning-out rate n in accordance with the algorithm shown in FIG. 9 so that a temporal updating interval of a video image between continuous fields becomes constant. Then, the control signal is output. In this example, the recording rate read from the header information is set to 60 fps and the display rate set in the operation unit 7 is set to 50 fps, and therefore, the recording rate (60 fps) is higher than the display rate (50 fps). Thus, the frame rate conversion control unit 36 initializes the dividing value k to 2 (the steps S10 and S11). After that, the dividing value k is incremented one by one until the display rate becomes higher than the recording rate obtained by k-division (the steps S13 and S14). Since "display rate (50 fps)≧recording rate (60 fps)/k" is established when the dividing value k is 2 in this example, the dividing value k is 2. Subsequently, the frame rate conversion control unit 36 sets "k−1=1" as the frame thinning-out rate n (the step S15). As a result, the frame rate conversion control unit 36 outputs the control signal so as to thin out one frame for each time.

Then, in the same manner as in the frame rate conversion processing of the finder operation described above, the thinning-out processing unit 21 thins out one frame for each time. The frame rate conversion processing unit 31 converts the rate of the image data, 30 fps, into 50 fps by repeated display of the frame.

By the image reproduction operation as described above, the temporal updating interval of a video image between continuous fields after thinning-out becomes constant. Then, the image data whose rate is converted into 50 fps is output to the image reproduction I/F unit 12 to be displayed on the first display apparatus 13 or the second display apparatus 14.

In the above-described manner, during the image reproduction, the image reproduction I/F unit 12 and the rate conversion unit 11 are controlled so as to output the image signal at the display rate of 50 fps.

Next, image display when the frame thinning-out rate n does not become 1 will be described. Herein, as an example, two cases will be described: the case where the recording rate is 120 fps and the display rate is 50 fps; and the case where the recording rate is 120 fps and the display rate is 59.94 fps.

When the recording rate is 120 fps and the display rate is 50 fps, the user sets the recording rate to 120 fps in the operation unit 7. As a result, the sensor drive timing generation unit 6 outputs the drive signal to the sensor 2 so as to load the image signal at a rate of 120 fps. Then, in the same manner as in the operation during recording described above, the compressed data whose frame rate is 120 fps is recorded onto the recording medium 9.

Figure 5:
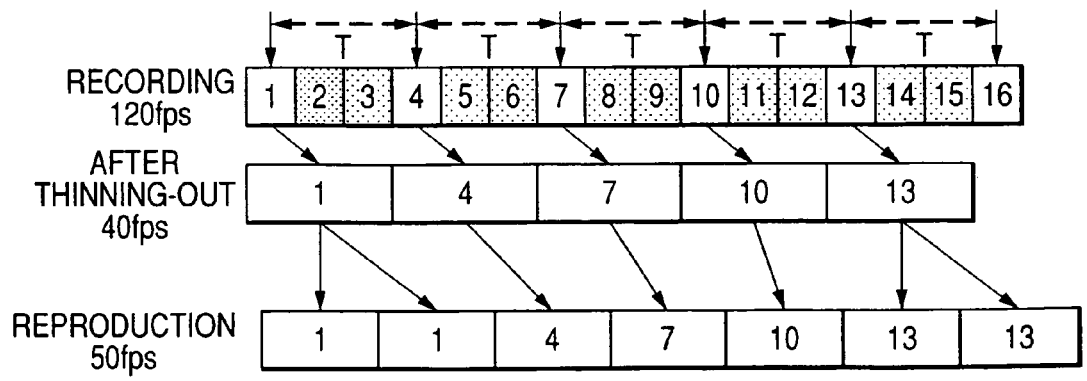
FIG. 5 is a diagram showing another rate conversion processing in the first embodiment of the present invention.

Herein, a method of performing image reproduction of the compressed data recorded at 120 fps as described above at the display rate of 50 fps will be described with reference to FIGS. 2 and 5. If the first display apparatus 13 is a PAL system monitor, the user sets the display rate to 50 fps in the operation unit 7. As a result, the control signal is output from the operation unit 7 to the image reproduction I/F unit 12 and the rate conversion unit 11 so as to output the image data at the display rate of 50 fps during image reproduction.

In the rate conversion unit 11, the frame rate conversion control unit 36 determines the frame thinning-out rate n in accordance with the algorithm shown in FIG. 9 so that a temporal updating interval of a video image between continuous fields becomes constant. Then, the control signal is output. In this example, the recording rate read from the header information is set to 120 fps and the display rate set in the operation unit 7 is set to 50 fps, and therefore, the recording rate (120 fps) is higher than the display rate (120 fps). Thus, the frame rate conversion control unit 36 initializes the dividing value k to 2 (the steps S10 and S11). After that, the dividing value k is incremented one by one until the display rate becomes higher than the recording rate obtained by k-division (the steps S13 and S14). Since "display rate (50 fps) ≧recording rate (120 fps)/k" is established when the dividing value k is 3 in this example, the dividing value k is 3. Subsequently, the frame rate conversion control unit 36 sets "k−1=2" as the frame thinning-out rate n (the step S15). As a result, the frame rate conversion control unit 36 outputs the control signal so as to thin out two frames for each time.

Subsequently, the thinning-out frame memory writing unit 22 repeats the operation of writing only the first one of frame data of continuous three frames for the image data output from the decoding unit 10 onto the first frame memory 23 and then writing the remaining two frames onto the second frame memory 24 on the basis of the control signal from the frame rate conversion control unit 36. For example, in FIG. 5, the following operation is repeated. After the frame 1 is written into the first frame memory 23, the frames 2 and 3 are written into the second frame memory 24. After the frame 4 is written into the first frame memory 23, the frames 5 and 6 are written into the second frame memory 24.

Next, the thinning-out frame reading unit 25 reads out the frame data only from the first frame memory 23 on the basis of the control signal from the frame rate conversion control unit 36. As a result, the frame rate of the image data after thinning-out becomes 40 fps, which is lower than the display rate. At the same time, time differences T corresponding to the temporal updating intervals of the video image between continuous fields become equal to each other.

Subsequently, the number of repeated display is determined for each frame in the frame rate conversion processing unit 31 to convert the image data at 40 fps after thinning-out into 50 fps corresponding to the display rate of the first display apparatus. Specifically, first, the rate conversion frame memory writing unit 32 writes the input frame data alternately into the third frame memory 33 and the fourth frame memory 34.

After that, the rate conversion frame memory reading unit 35 repeats reading for continuous four frames after thinning-out in the following manner on the basis of the control signal from the frame rate conversion control unit 36; reading out twice from the third frame memory 33, reading out once from the fourth frame memory 34, reading out once from the third frame memory 33, and reading out once from the fourth frame memory 34. As a result, as shown in FIG. 5, four frames are repeatedly read out twice, once, once, and once, i.e., five times in total, in such a manner that the frame 1 is read out twice, the frame 4 once, the frame 7 once, and the frame 10 once. In this manner, the rate of image data, 40 fps, is converted into 50 fps.

According to the above-described operation, since the time differences T are equal to each other between frame data after thinning-out, image display without any unnaturalness is possible.

On the other hand, when the recording rate is 120 fps and the display rate is 59.94 fps, the user sets the recording rate to 120 fps in the operation unit 7. As a result, the sensor drive timing generation unit 6 outputs the drive signal to the sensor 2 so as to load the image signal at a rate of 120 fps. Then, in the same manner as in the operation during recording described above, the compressed data whose frame rate is 120 fps is recorded onto the recording medium 9.

Figure 6:
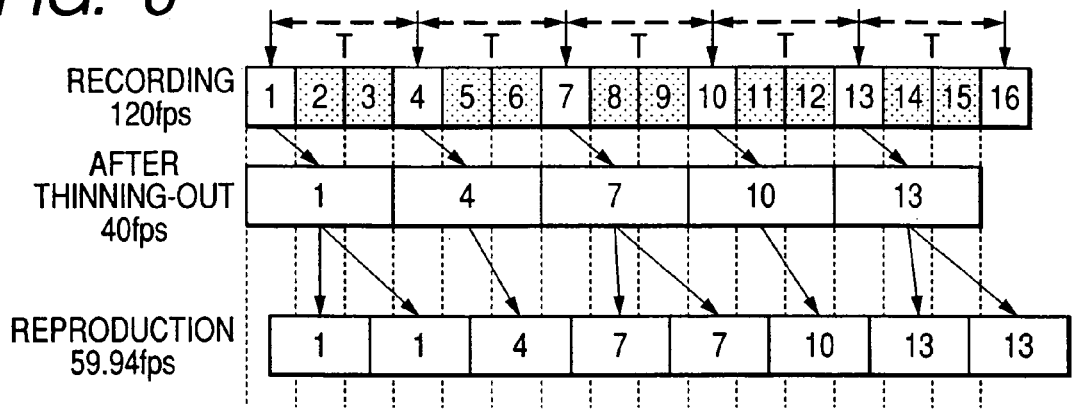
FIG. 6 is a diagram showing further rate conversion processing in the first embodiment of the present invention.

Herein, a method of performing image reproduction of the compressed data recorded at 120 fps as described above at the display rate of 59.94 fps will be described with reference to FIGS. 2 and 6. In this case, the user sets the display rate to 59.94 fps in the operation unit 7. As a result, the control signal is output from the operation unit 7 to the image reproduction I/F unit 12 and the rate conversion unit 11 so as to output the image data at the display rate of 59.94 fps during image reproduction.

In the rate conversion unit 11, the frame rate conversion control unit 36 determines the frame thinning-out rate n in accordance with the algorithm shown in FIG. 9 so that a temporal updating interval of a video image between continuous fields becomes constant. Then, the control signal is output. In this example, the recording rate read out from the header information is set to 120 fps and the display rate set in the operation unit 7 is set to 59.94 fps, and therefore, the recording rate (120 fps) is higher than the display rate (59.94 fps). Thus, the frame rate conversion control unit 36 initializes the dividing value k to 2 (the steps S10 and S11). After that, the dividing value k is incremented one by one until the display rate becomes higher than the recording rate obtained by k-division (the steps S13 and S14). Since "display rate (59.94 fps)≧recording rate (120 fps)/k" is established when the dividing value k is 3 in this example, the dividing value k is 3. Subsequently, the frame rate conversion control unit 36 sets "k−1=2" as the frame thinning-out rate n (the step S15). As a result, the frame rate conversion control unit 36 outputs the control signal so as to thin out two frames for each time.

Subsequently, in the same manner as in the example described above, the thinning-out frame memory writing unit 22 repeats the operation of writing only the first one of frame data of continuous three frames for the image data output from the decoding unit 10 into the first frame memory 23 and then writing the remaining two frames into the second frame memory 24 on the basis of the control signal from the frame rate conversion control unit 36. For example, in FIG. 6, the following operation is repeated. After the frame 1 is written into the first frame memory 23, the frames 2 and 3 are written into the second frame memory 24. After the frame 4 is written into the first frame memory 23, the frames 5 and 6 are written into the second frame memory 24.

Next, the thinning-out frame reading unit 25 reads the frame data only from the first frame memory 23 on the basis of the control signal from the frame rate conversion control unit 36. As a result, the frame rate of the image data after thinning-out becomes 40 fps to be lower than the display rate. At the same time, time differences T corresponding to the temporal updating intervals of the video image between continuous fields become equal to each other.

Subsequently, the number of repeated display is determined for each frame in the frame rate conversion processing unit 31 to convert the image data at 40 fps after thinning-out into 59.94 fps corresponding to the display rate of the second display apparatus. Specifically, first, the rate conversion frame memory writing unit 32 writes the input frame data alternately into the third frame memory 33 and the fourth frame memory 34.

After that, the rate conversion frame memory reading unit 35 repeats reading for continuous two frames after thinning-out in the following manner on the basis of the control signal from the frame rate conversion control unit 36; reading out twice from the third frame memory 33, and reading out once from the fourth frame memory 34. As a result, as shown in FIG. 6, two frames are repeatedly read out twice, and once, i.e., three times in total, in such a manner that the frame 1 is read out twice, and the frame 4 once. In this manner, the rate of image data, 40 fps, is converted into 60 fps.

However, the set display rate is not 60 fps but 59.94 fps, an offset is generated.

Therefore, in this embodiment, for example, (1) the first to the 501-th frames are repeatedly read out twice and then once as described above;

(2) the 502-th frame is read out once;

(3) the 503-th to 1000-th frames are repeatedly read out twice and then once as described above;

(4) the 1001-th frame is read out once;

(5) the 1002-th to 1499-th frames are repeatedly read out twice and then once as described above;

(6) the 1500-th frame is read out once;

(7) the 1501-th to 1998-th frames are repeatedly read out twice and then once as described above;

(8) the 1999-th frame is read out once;

(9) the 2000-th to 2500-th frames are repeatedly read out twice and then once as described above;

(10) the 2501-th frame is read out once;

(11) the 2502-th to 2999-th frames are repeatedly read out twice and then once as described above; and

(12) the 3000-th frame is read out once.

By reading out as described above, the image data can be output not at 60 fps but at 59.94 fps.

According to the operation as described above, even if the display rate is 59.94 fps, image display without any unnaturalness is possible because the time differences T are equal between frame data after thinning-out.

In the above-described operation, the thinning-out operation is performed at the time of reading from the first and second frame memories 23 and 24 after all the images are decoded. If the frame rate conversion control unit 36 is provided in the decoding unit 10, the same thinning-out operation can be performed by outputting the image data without decoding the frame to be thinned out on the basis of the control signal from the frame rate conversion control unit 36. For example, the operation unit 7 outputs the control signal based on the set display rate (for example, 50 fps) to the decoding unit 10. The decoding unit 10 reads out the recording rate from the header information in the compressed image data read from the recording medium 9. The read recording rate and the control signal output from the operation unit 7 are compared with each other. Herein, if, for example, the recording rate is 60 fps and the display rate is 50 fps, the decoding unit 10 does not decode the compressed image data read from the recording medium 9 for each frame but outputs only the decoded image data to the rate conversion unit 11 at the later stage to halve the updating rate of the image. As a result, the temporal updating interval of the video image between continuous fields becomes constant. The same thinning-out as the thinning-out operation performed in the rate conversion unit 11 described above is performed by the decoding unit 10. As a result, since the thinning-out processing unit 21 in the rate conversion unit 11 is no longer needed, the frame memories can be reduced.

Second Embodiment

Next, a second embodiment of the present invention will be described. In this embodiment, an operation of the rate conversion unit 11 in the case of reproduction at a variable speed, that is, not normal-speed reproduction, for example, slow reproduction is selected in the operation unit 7, will be described.

Since a reproduction speed is set in the operation unit 7 in the second embodiment, the frame rate conversion control unit 36 generates a control signal in consideration of not only the recording rate and the display rate but also the reproduction speed. Hereinafter, the operation of the frame rate conversion control unit 36 will be described. FIG. 10 is a flowchart showing the operation of the frame rate conversion control unit 36 in reproduction at a variable speed.

During a variable-speed operation, the frame rate conversion control unit 36 compares a value obtained by multiplying the recording rate set in the operation unit 7 by a reproduction speed magnification S (the result of multiplication) with the display rate (step S20). If the result of multiplication of the recording rate by the reproduction speed magnification S is higher than the display rate, the dividing value k is initialized to 2 (step S21). After that, until the display rate becomes higher than the result of multiplication divided by the dividing value k, the dividing value k is incremented one by one (steps S23 and S24). Herein, the reproduction speed magnification S denotes a magnification where a normal reproduction speed is 1.

Then, when the display rate becomes equal to or higher than the result of multiplication obtained by k-division, that is, the dividing value k providing the display rate equal to or higher than the result of multiplication is obtained at the step S23, the frame thinning-out rate n is determined to "k−1" (step S25). Specifically, if the result of multiplication (the product) of the recording rate set in the operation unit 7 and the reproduction speed magnification S is higher than the set display rate, the dividing value k is set so that the result of multiplication obtained by k-division becomes lower than and closest to the display rate. On the basis of the dividing value k, the frame thinning-out rate n is determined.

On the other hand, if the result of multiplication is equal to or lower than the display rate as a result of determination at the step S20, the dividing value k is initialized to 1 (step S22). After that, the processing at the step S25 is performed. In this case, however, since the dividing value k is 1, the frame thinning-out rate n becomes 0. Therefore, if the result of multiplication is equal to or lower than the display rate, the rate conversion unit 11 outputs the image data without performing the thinning-out processing.

In the above-described manner, the frame thinning-out rate n is determined by the frame rate conversion control unit 36 on the basis of the recording rate and the display rate set in the operation unit 7, and the reproduction speed magnification S. On the basis of the frame thinning-out rate n, the rate conversion unit 11 performs the thinning-out processing.

Figure 7:
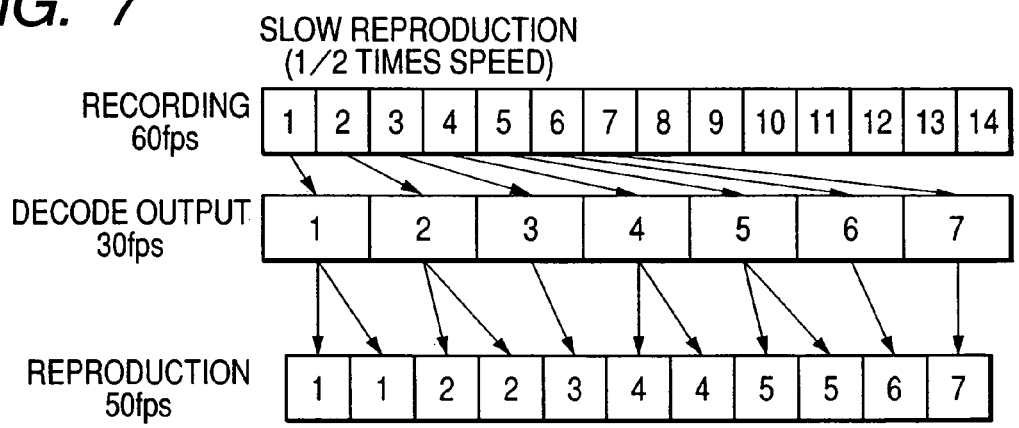
FIG. 7 is a diagram showing rate conversion processing in a second embodiment of the present invention.

Herein, an operation when slow reproduction at 1/2 time speed is performed at the recording rate of 60 fps and the display rate of 50 fps will be described. FIG. 7 is a diagram showing the relation between a frame recorded at a recording rate of 60 fps and a frame output to the display apparatus at a display rate of 50 fps after the frame rate conversion processing.

When the user switches the reproduction speed from the normal speed to the slow reproduction (1/2 time speed) in the operation unit 7, the operation unit 7 outputs a control signal indicating the switching to the decoding unit 10 and the rate conversion unit 11. Upon reception of the control signal, the decoding unit 10 outputs the frame data read from the recording medium 9 to the rate conversion unit 11 at a half speed of the frame rate (60 fps) at which the frame data is recorded.

After that, the frame rate conversion control unit 36 determines the frame thinning-out rate n in accordance with the algorithm shown in FIG. 10 so that the temporal updating interval of the video image between continuous fields becomes constant. Then, the frame rate conversion control unit 36 outputs the control signal. In this example, the recording rate is set to 60 fps and the display rate is set to 50 fps. Moreover, the reproduction speed magnification S is 1/2, and the result of multiplication (30 fps) of the recording rate (60 fps) by the reproduction speed magnification S (1/2) is lower than the display rate (50 fps). Therefore, the frame rate conversion control unit 36 initializes the dividing value k to 1 (steps S20 and S22). As a result, the frame thinning-out rate n becomes 0 (step S25). Specifically, in the case of a normal reproduction speed (at ×1 speed), the frame rate conversion processing is performed after the processing for thinning-out the frames to 1/2 is performed, as in the first embodiment. On the other hand, in the case of slow reproduction (at 1/2 time speed), the frame rate conversion processing is performed without thinning-out. Therefore, by outputting the frame data contained in the recorded image data as much as possible, images can be displayed with a gentler change.

Figure 8:
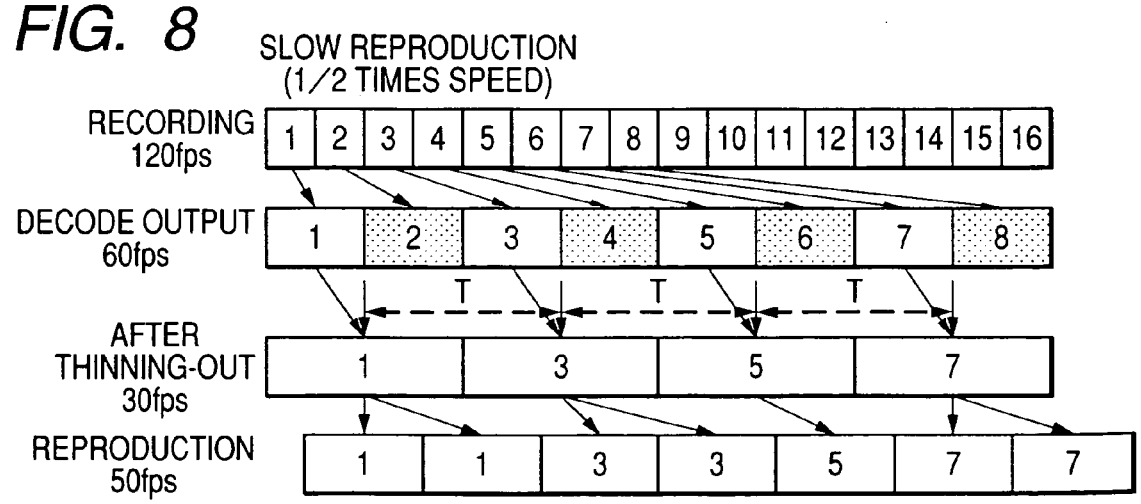
FIG. 8 is a diagram showing another rate conversion processing in the second embodiment of the present invention.

Next, an operation when slow reproduction at 1/2 time speed is performed with the recording rate of 120 fps and the display rate of 50 fps will be described. FIG. 8 is a diagram showing the relation between a frame recorded at a recording rate of 120 fps and a frame output to the display apparatus at a display rate of 50 fps after the frame rate conversion processing.

When the user switches the reproduction speed from the normal speed to the slow reproduction (1/2 time speed) in the operation unit 7, the operation unit 7 outputs a control signal indicating the switching to the decoding unit 10 and the rate conversion unit 11. Upon reception of the control signal, the decoding unit 10 outputs the frame data read from the recording medium 9 to the rate conversion unit 11 at a half speed of the frame rate (120 fps) at which the frame data is recorded.

After that, the frame rate conversion control unit 36 determines the frame thinning-out rate n in accordance with the algorithm shown in FIG. 10 so that the temporal updating interval of the video image between continuous fields becomes constant. Then, the frame rate conversion control unit 36 outputs the control signal. In this example, the recording rate is set to 120 fps and the display rate is set to 50 fps. Moreover, the reproduction speed magnification S is 1/2, and the result of multiplication (60 fps) between the recording rate (120 fps) and the reproduction speed magnification S (1/2) is higher than the display rate (50 fps). Therefore, the frame rate conversion control unit 36 initializes the dividing value k to 2 (steps S20 and S21). After that, the dividing value k is incremented one by one until the display rate becomes higher than the result of multiplication obtained by k-division (steps S23 and S24). In this example, since "the display rate (50 fps)≧the recording rate (120 fps)×the reproduction speed magnification S (1/2)/k" is established when the dividing value k is 2, the dividing value k obtained is 2. Then, the frame rate conversion control unit 36 sets "k−1=1" as the frame thinning-out rate n (step S25). As a result, the frame rate conversion control unit 36 outputs the control signal so as to thin out one frame for each time. Specifically, in the case of a normal reproduction speed (at ×1 speed), the frame rate conversion processing is performed after the processing for thinning-out the frames to 1/3 is performed, as in the first embodiment. On the other hand, in the case of slow reproduction (at 1/2 time speed), after the processing for thinning out the frames to 1/2, the frame rate conversion processing is performed. Therefore, by outputting the frame data contained in the recorded image data as much as possible, images can be displayed with a gentler change.

The same operation is possible not only in the case of slow reproduction but also in the case of fast-forward reproduction.

Figure 14:
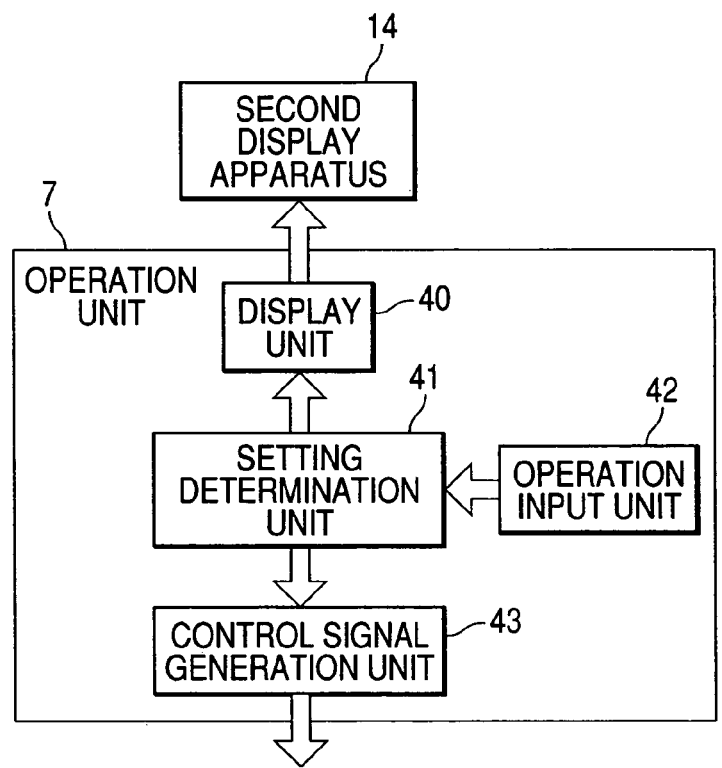
FIG. 14 is a block diagram showing a configuration of the operation unit 7.

Next, an input interface for the display rate, the recording rate, and the like set in the operation unit 7 will be described. FIG. 14 is a block diagram showing a configuration of the operation unit 7. As shown in FIG. 14, a display unit 40, a setting determination unit 41, an operation input unit 42, and a control signal generation unit 43 are provided in the operation unit 7.

Figure 15A:
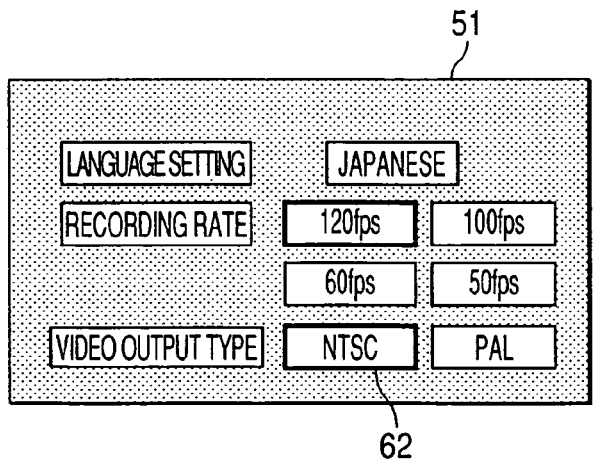
FIGS. 15A and 15B are diagrams showing an example of a selection screen displayed on a second display apparatus 14.
Figure 15B:
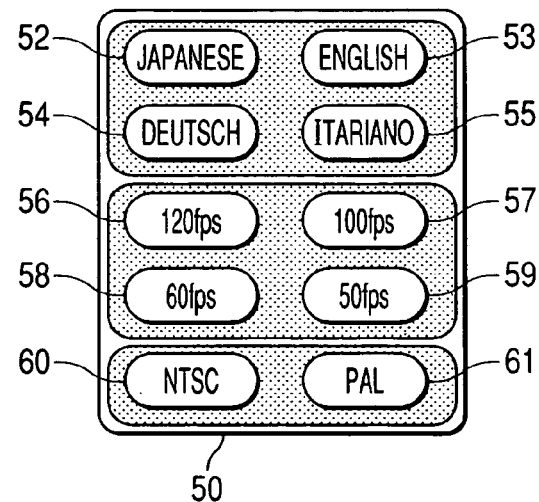

The operation input unit 42 includes switches for selecting the setting such as, for example, the recording rate, the display rate, and a display language. The setting determination unit 41 determines the setting such as the recording rate, the display rate, and the display language in accordance with the contents of the operation of the switch constituting the operation input unit 42. The display unit 40 creates, for example, a selection screen as shown in FIGS. 15A and 15B on the basis of the setting information output from the setting determination unit 41 to display the selection screen on the second display apparatus 14. The control signal generation unit 43 outputs a control signal to the sensor drive timing generation unit 6 on the basis of the set recording rate during recording and outputs control signals to the decoding unit 10, the rate conversion unit 11, and the image reproduction I/F unit 12 on the basis of the set display rate during image reproduction.

The second display apparatus 14 is, for example, a touch panel type LCD. On its screen 51, as the operation input unit 42, for example, switches 60 and 61 for selecting any one of the NTSC (60 fps) and the PAL (50 fps) as video output type (the display rate) and switches 56 to 59 for selecting any one of 120 fps, 100 fps, 60 fps, and 50 fps are provided. Furthermore, switches 52 to 55 corresponding to several languages are also displayed as the operation input unit 42 on the screen 51 for language setting for setting a display language on the LCD. On the screen 51, a selected setting item is displayed so as to be surrounded by a thick line 62.

Figure 11:
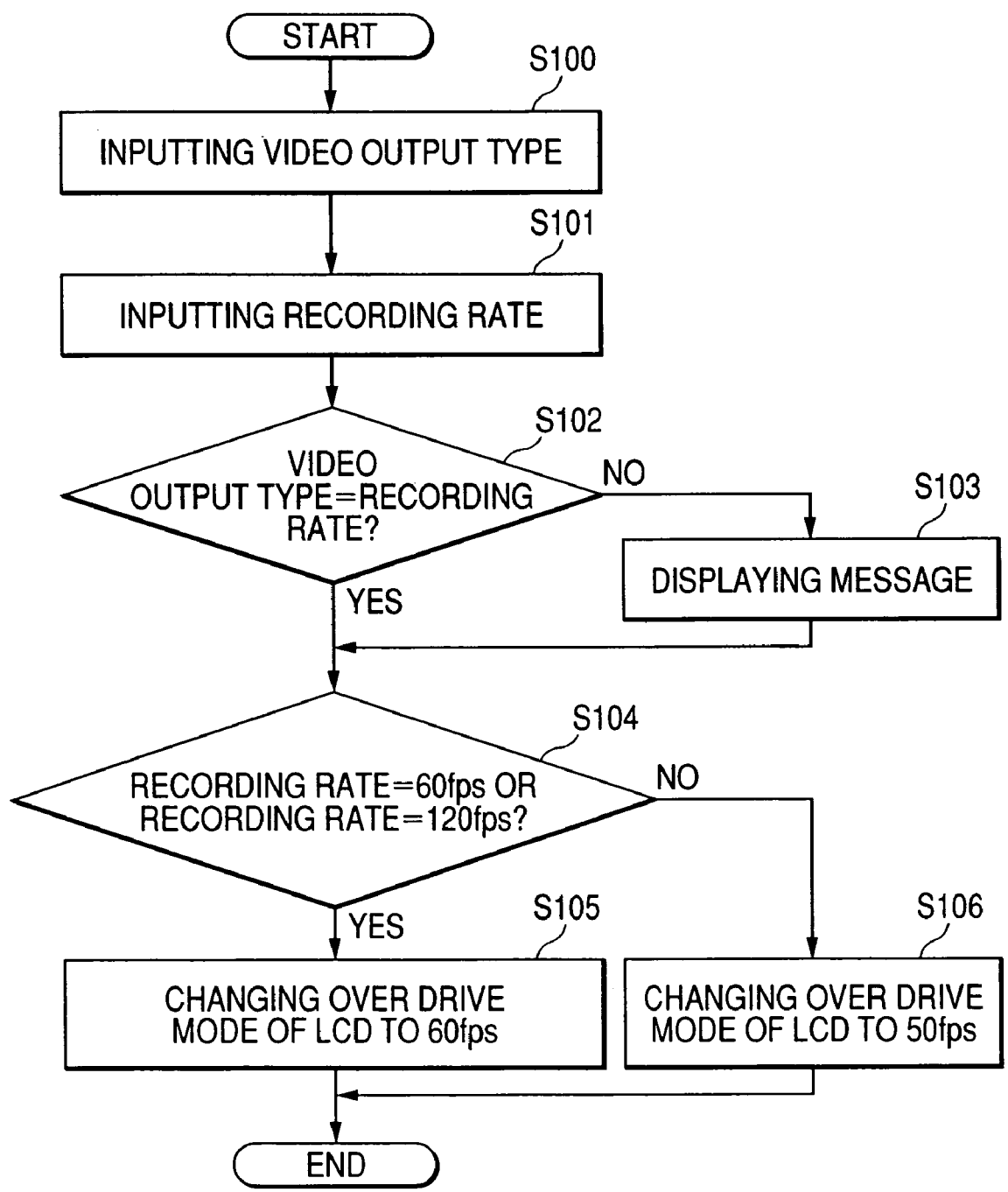
FIG. 11 is a flowchart showing an operation of an operation unit 7.

Next, the operation of the operation unit 7 will be described with reference to a flowchart of FIG. 11.

First, the user inputs the video output type (the display rate) by depressing any one of the switches 60 and 61 (step S100) and inputs the recording rate by depressing any one of the switches 56 to 59 (step S101). Alternatively, the video output type may be input after the recording rate input. When the already recorded image data is reproduced, however, the recording rate is set on the basis of recording rate information read out by the decoding unit 10 at the step S101.

Figure 17:
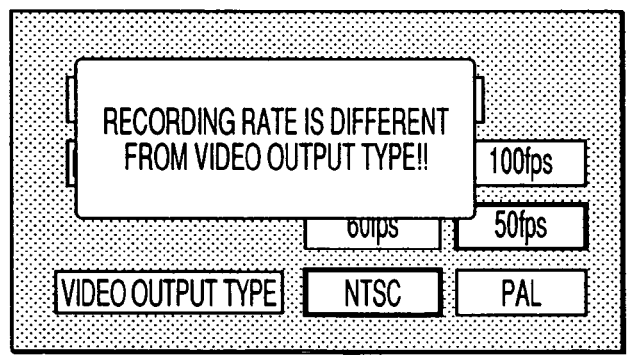
FIG. 17 is a diagram showing an example of message display when "Japanese" and "NTSC" are selected.
Figure 18:
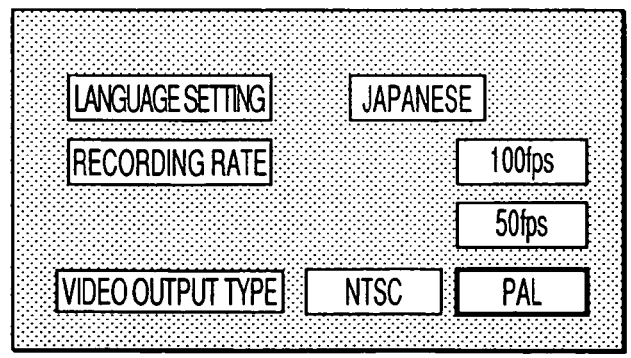
FIG. 18 is a diagram showing an example of the selection screen when "Japanese" and "PAL" are selected.
Figure 19:
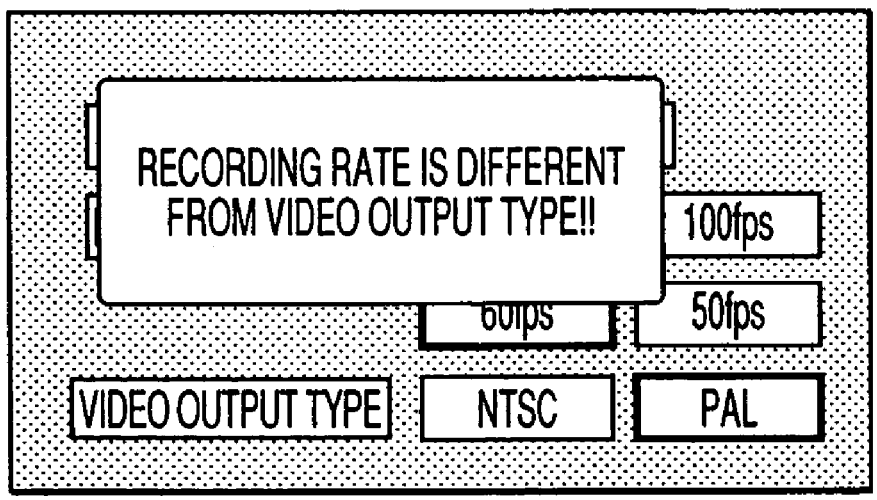
FIG. 19 is a diagram showing an example of message display when "Japanese" and "PAL" are selected.

Next, the input video output type and the frame rate of the recording rate are compared with each other to determine if they are equal to each other (step S102). If they are not equal to each other, a message indicating that the video output type and the recording rate differ from each other is displayed as shown in FIG. 17 or FIG. 19, so that the user is notified of it (step S103).

Subsequently, the set recording rate is checked if it is 120 fps or 60 fps (step S104). If the recording rate is either 120 fps or 60 fps, the control signal generation unit 43 outputs a control signal for switching a drive mode of the LCD (the second display apparatus 14) for displaying the image data to 60 fps (step S105). On the other hand, if the recording rate is neither 120 fps nor 60 fps, the control signal generation unit 43 outputs a control signal for switching the drive mode of the LCD (the second display apparatus 14) to 50 fps (step S106).

As described above, in the operation unit 7, the setting determination unit 41 determines the video output type and the recording rate on the basis of the setting input through the operation input unit 42 to output the setting information such as the video output type and the recording rate to the control signal generation unit 43. If the recording rate and the video output type differ from each other, a message is displayed on the second display apparatus 14 through the display unit 40.

Moreover, the control signal generation unit 43 outputs a control signal to the sensor drive timing generation unit 6 on the basis of the set recording rate. The control signal generation unit 43 outputs control signals to the decoding unit 10, the rate conversion unit 11, and the image reproduction I/F unit 12 on the basis of the set display rate (the video output type) during the image reproduction. Furthermore, the control signal generation unit 43 outputs a control signal for switching the drive mode suitable for the recording rate to the LCD capable of switching the display rate for displaying the image data.

Figure 12:
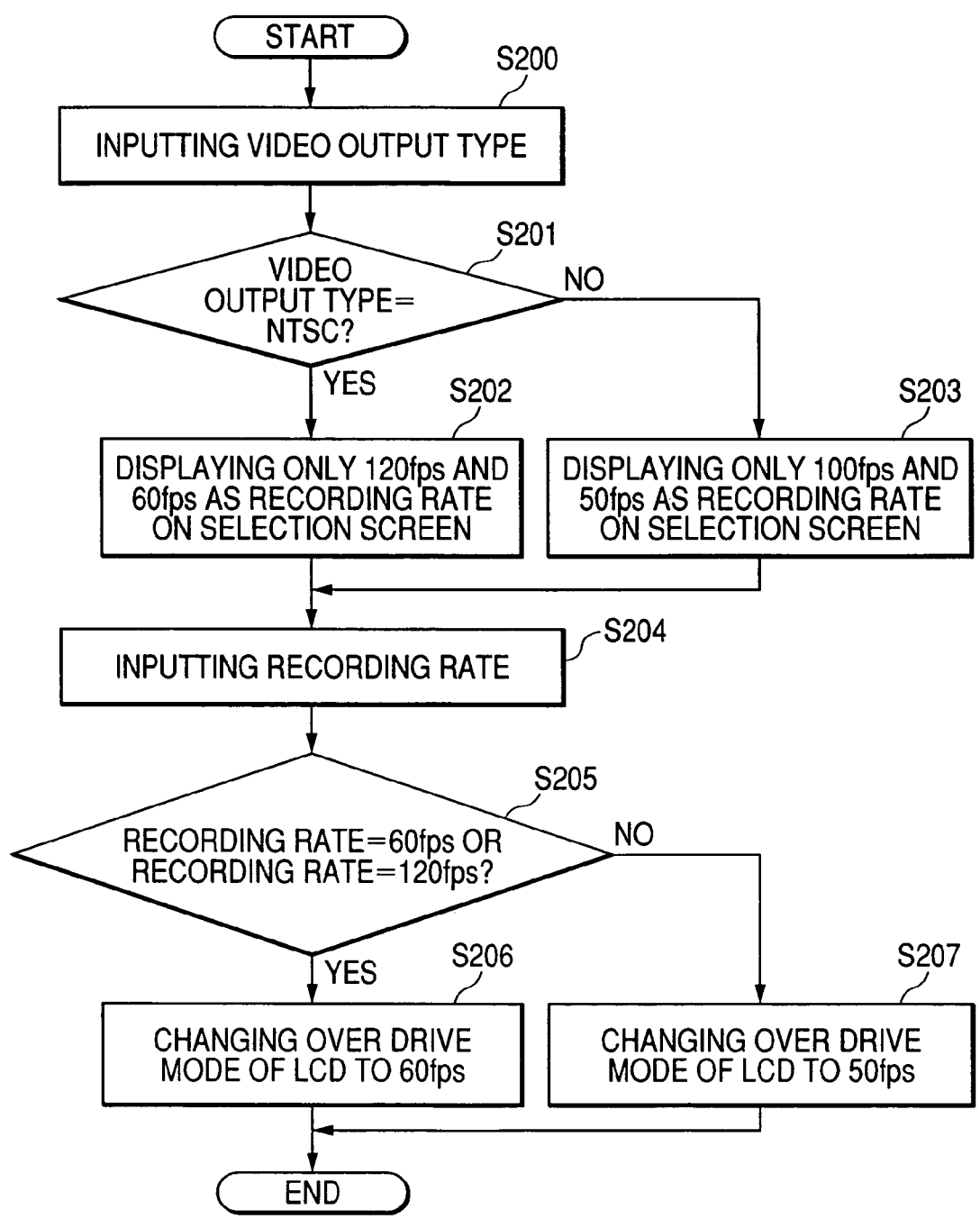
FIG. 12 is a flowchart showing an operation when a recording rate is automatically set in the operation unit 7.

Moreover, the operation unit 7 may have such a structure that the recording rate is automatically set on the basis of the input video output type. FIG. 12 is a flowchart showing an operation when the operation unit 7 automatically sets the recording rate.

First, the user inputs the video output type by depressing any one of the switches 60 and 61 (step S200).

Figure 16:
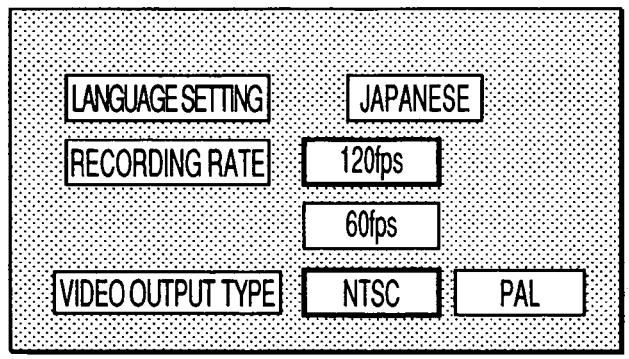
FIG. 16 is a diagram showing an example of the selection screen when "Japanese" and "NTSC" are selected.

Next, it is determined if the input video output type is NTSC (step S201). If it is NTSC, for example, as shown in FIG. 16, only 120 fps and 60 fps are displayed as selectable recording rates on the selection screen 51 so that 100 fps and 50 fps cannot be selected (step S202). On the other hand, if the input video output type is not NTSC, for example, the video output type is PAL, only 100 fps and 50 fps are displayed as selectable recording rates on the selection screen 51 so that 120 fps and 60 fps cannot be selected (step S203).

Subsequently, the user inputs the recording rate by depressing any one of the switches 56 to 59 (step S204). However, even if the switch for the recording rate that is not displayed on the selection screen as the result of determination of the video output type at the step S201 is selected, the setting cannot be entered.

Subsequently, the set recording rate is checked if it is 120 fps or 60 fps (step S205). If the recording rate is either 120 fps or 60 fps, the control signal generation unit 43 outputs a control signal for switching a drive mode of the LCD (the second display apparatus 14) for displaying the image data to 60 fps (step S206). On the other hand, if the recording rate is neither 120 fps nor 60 fps, the control signal generation unit 43 outputs a control signal for switching the drive mode of the LCD (the second display apparatus 14) to 50 fps (step S207).

As described above, the operation unit 7 limits the recording rates which can be selected by the setting determination unit 41, on the basis of the setting of the video output type input through the operation input unit 42 so as to limit the frame rates of the recording rate displayed on the display unit 40. Then, the setting determination unit 41 determines the recording rate on the basis of the recording rate input through the operation input unit 42 to output the setting information about the video output type and the recording rate to the control signal generation unit 43.

Figure 13:
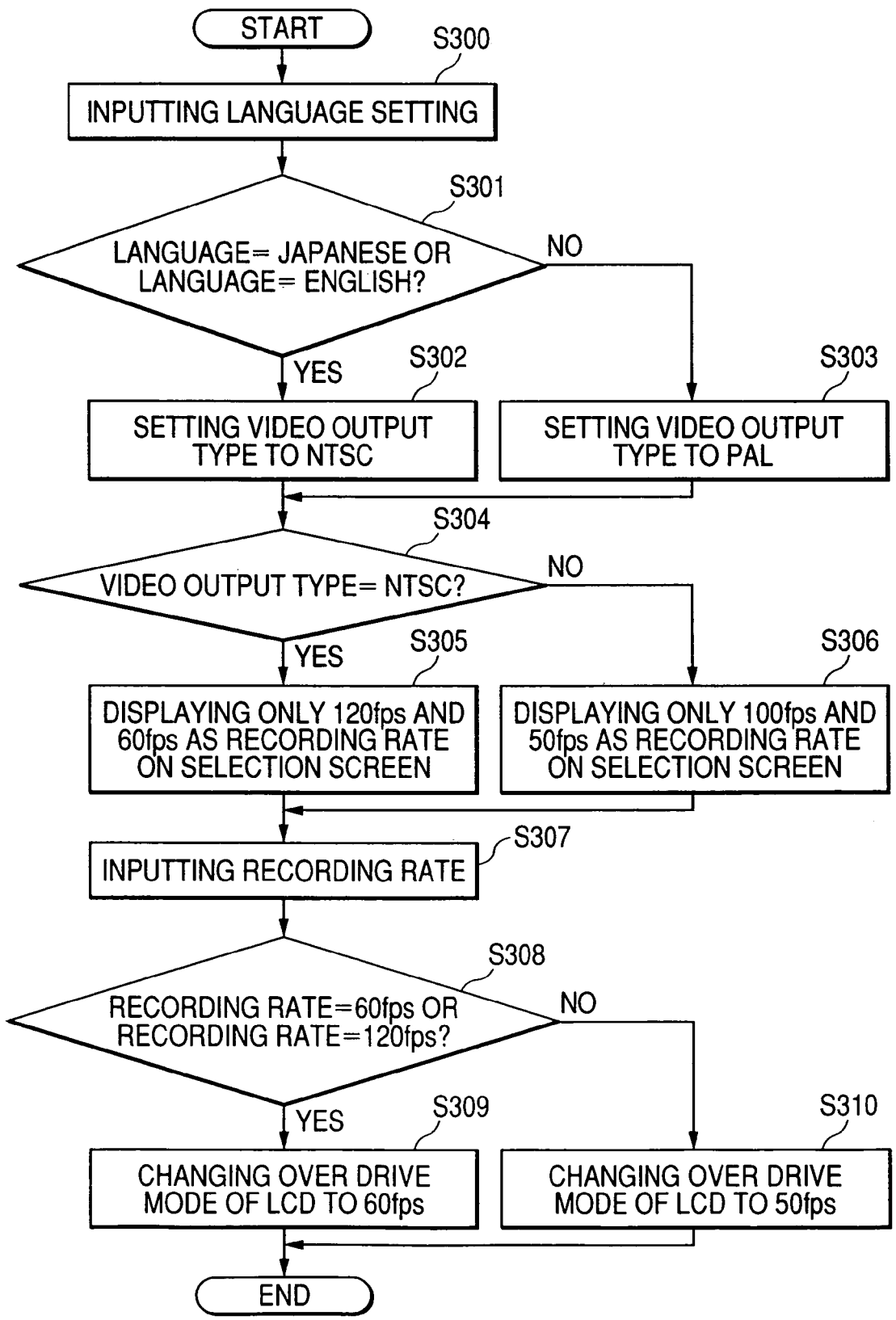
FIG. 13 is a flowchart showing an operation when the operation unit 7 automatically sets a recording rate in accordance with a language.

Alternatively, in accordance with a selectable language, the video output type used in the area where the language is principally used may be determined in advance 30 that the recording rate is automatically set on the basis of the input language setting. FIG. 13 is a flowchart showing an operation when the operation unit 7 automatically sets the recording rate in accordance with the language.

First, the user inputs setting of a language displayed on the selection screen 51 by depressing any one of the switches 52 to 55 (step S300).

Next, it is determined if the input language is either Japanese or English (step S301). If the input language is either Japanese or English, the video output type is set to NTSC (step S302). On the other hand, if the input language is neither Japanese nor English, for example, is Italian or German, the video output type is set to PAL (step S303).

Figure 20:
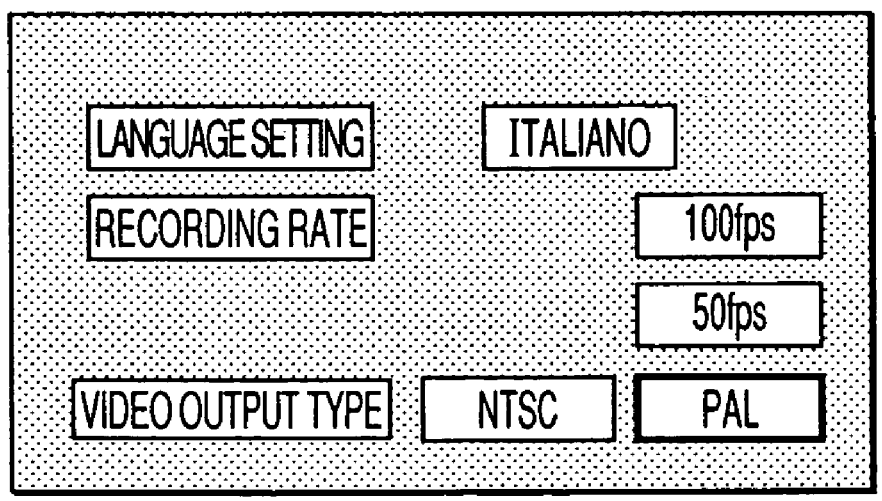
FIG. 20 is a diagram showing an example of the selection screen when "Italian" and "PAL" are selected.

Next, it is determined if the input video output type is NTSC (step S304). If it is NTSC, for example, as shown in FIG. 16, only 120 fps and 60 fps are displayed as selectable recording rates on the selection screen 51 so that 100 fps and 50 fps cannot be selected (step S305). On the other hand, if the input video output type is not NTSC, for example, as shown in FIG. 20, the video output type is PAL, only 100 fps and 50 fps are displayed as selectable recording rates on the selection screen 51 so that 120 fps and 60 fps cannot be selected (step S306).

Subsequently, the user inputs the recording rate by depressing any one of the switches 56 to 59 (step S307). However, even if the switch for the recording rate that is not displayed on the selection screen as the result of determination of the video output type at the step S304 is selected, the setting cannot be entered.

Subsequently, the set recording rate is checked if it is 120 fps or 60 fps (step S308). If the recording rate is either 120 fps or 60 fps, the control signal generation unit 43 outputs a control signal for switching a drive mode of the LCD,(the second display apparatus 14) for displaying the image data to 60 fps (step S309). On the other hand, if the recording rate is neither 120 fps nor 60 fps, the control signal generation unit 43 outputs a control signal for switching the drive mode of the LCD (the second display apparatus 14) to 50 fps (step S310).

As described above, in the operation unit 7, on the basis of the language setting input in the operation input unit 42, the setting determination unit 41 determines the selectable video output type on the basis of the television display type in the area where the language is used. Moreover, the setting determination unit 41 limits selectable recording rates on the basis of the video output type determined by itself to limit the frame rates of the recording data displayed on the display unit 40. Then, the setting determination unit 41 determines the recording rate on the basis of the recording rate input through the operation input unit 42 to output the setting information about the video output type and the recording rate to the control signal generation unit 43.

The embodiments of the present invention can be realized by, for example, the execution of a program by a computer. Moreover, means for supplying a program to a computer, for example, a computer readable recording medium on which such a program is recorded, such as a CD-ROM, or a transmission medium for transmitting such a program, such as the Internet, is also applicable as the embodiment of the present invention. Furthermore, the above-mentioned program is also applicable as the embodiment of the present invention. The above-described program, recording medium, transmission medium, and program product fall into the scope of the present invention.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-273564 filed Sep. 21, 2004, which is hereby incorporated by reference herein.

What is claimed is:

1. An image pickup apparatus, comprising:
   an image pickup unit for picking up an object image;
   a recording unit for recording image data obtained by the image pickup unit onto a recording medium;
   a display unit selectively displaying an image related to any one of the image data obtained by the image pickup unit and the image data recorded on the recording medium on a display apparatus;
   an image thinning-out unit for comparing a rate at the time of photographing of the image to be displayed by the display unit and a display rate in the display apparatus and if the rate at the time of photographing is higher than the display rate, thinning out the image to be displayed by the display unit, at a predetermined interval to lower the rate, thereby generating a display image of a rate lower than the display rate; and a rate conversion unit for inserting repeatedly output images to the display image generated by the image thinning-out unit to increase the rate of the display image so that the rate of the display image is made equal to the display rate.

2. An apparatus according to claim 1, wherein the image thinning-out unit includes:

a comparison unit for comparing the rate at the time of photographing and the display rate with each other;

a dividing value calculation unit for calculating a dividing value k corresponding to thinning out k−1 frames after displaying one image frame, on the basis of the result of comparison by the comparison unit; and a thinning-out processing unit for performing thinning-out processing of the image in accordance with the dividing value k, wherein the image thinning-out unit thins out the frame in accordance with the dividing value k.

3. An apparatus according to claim 2, wherein the dividing value calculation unit includes:

a first initialization unit for initializing the dividing value k to 1 to provide the initialized dividing value k to the image thinning-out unit if the rate at the time of photographing is equal to or lower than the display rate as a result of comparison by the comparison unit;

a second initialization unit for initializing the dividing value k to 2 to provide the initialized dividing value k if the rate at the time of photographing is higher than the display rate as a result of comparison by the comparison unit; and a dividing value increment unit for incrementing the dividing value k initialized by the second initialization unit one by one until a frame rate obtained by dividing the rate at the time of photographing by k becomes equal to or lower than the display rate, to provide the dividing value k corresponding to the frame rate equal to or lower than the display rate to the frame thinning-out unit.

4. An apparatus according to claim 1, wherein the recording unit includes:

a compression unit for compression-encoding the image data obtained by the image pickup unit to generate compressed image data;

a rate information addition unit for adding information related to the rate at the time of the photographing to the compressed image data; and a compressed image data recording unit for recording the compressed image data onto the recording unit.

5. An apparatus according to claim 4, further comprising:

an expansion unit for reading out and expanding the compressed image data recorded on the recording medium; and a rate information reading unit for reading out the information related to the rate at the time of the photographing, which information is added to the compressed image data.

6. An apparatus according to claim 5, wherein the image thinning-out unit determines an image thinning-out rate by comparing the information related to the rate at the time of the photographing which information is added to the compressed image data, and the display rate in the display apparatus, when a reproduced image on the recorded medium is displayed on the display apparatus by the display unit.

7. An apparatus according to claim 1, further comprising operation unit for setting a recording rate at the time of a photographing operation, wherein the image thinning-out unit determines the image thinning-out rate by comparing the recording rate set by the operation unit and the display rate in the display apparatus, when the object image picked up by the pickup unit is displayed by the display unit on the display apparatus in parallel to the image pickup of the object image by the image pickup unit.

8. An apparatus according to claim 1, wherein the image thinning-out unit determines the image thinning-out rate by comparing a value obtained by multiplying a magnification of the reproduction speed of reproduction of the image data from the recording medium by the rate at the time of the photographing, and the display rate.

9. An apparatus according to claim 8, wherein the image thinning-out unit includes:

a multiplication unit for multiplying the magnification of the reproduction speed with respect to an image pickup speed by the rate at the time of the photographing to obtain a multiplied frame rate;

a comparison unit for comparing the multiplied frame rate and the display rate with each other;

a dividing value calculation unit for calculating a dividing value k corresponding to thinning out k−1 frames after displaying one image frame, on the basis of the result of comparison by the comparison unit; and a thinning-out processing unit for performing thinning-out processing of the image frame in accordance with the dividing value k.

10. An apparatus according to claim 9, wherein the dividing value calculation unit includes:

a first initialization unit for initializing the dividing value k to 1 to provide the initialized dividing value k to the image thinning-out unit if the multiplied frame rate is equal to or lower than the display rate as a result of comparison by the comparison unit;

a second initialization unit for initializing the dividing value k to 2 to provide the initialized dividing value k if the multiplied frame is higher than the display rate as a result of comparison by the comparison unit; and a dividing value increment unit for incrementing the dividing value k initialized by the second initialization unit one by one until a frame rate obtained by dividing the multiplied frame rate by k becomes equal to or lower than the display rate, to provide the dividing value k corresponding to the frame rate equal to or lower than the display rate to the image thinning-out unit.

11. A method of controlling an image pickup apparatus including an image pickup unit for picking up an object image, a recording unit for recording image data obtained by the image pickup unit onto a recording medium, and a display unit for selectively displaying the image from the image pickup unit and the recording image recorded onto the recording medium on a display apparatus, the method comprising:

an image thinning-out step of comparing a rate at the time of photographing of the image to be displayed by the display unit and a display rate in the display apparatus and if the rate at the time of photographing is higher than the display rate, thinning out the image to be displayed by the display unit, at a predetermined interval to lower the rate, thereby generating a display image of a rate lower than the display rate;

a rate conversion step of inserting repeatedly output images to the image generated in the image thinning-out step to increase the rate of the display image so that the rate of the display image is made equal to the display rate; and a display step of displaying the image whose rate is converted in the rate conversion step on the display apparatus.

12. A computer-readable recording medium storing a program comprising program code for causing a computer to execute a control procedure of an image pickup apparatus including an image pickup unit for picking up an object image, a recording unit for recording image data obtained by the image pickup unit onto a recording medium, and a display unit for selectively displaying the image from the image pickup unit and the recording image recorded onto the recording medium on a display apparatus, the program comprising:

code for an image thinning-out procedure of comparing a rate at the time of photographing of the image to be displayed by the display unit and a display rate in the display apparatus and if the rate at the time of photographing is higher than the display rate, thinning out the image to be displayed by the display unit, at a predetermined interval to lower the rate, thereby generating a display image of a rate lower than the display rate;

code for a rate conversion procedure of inserting repeatedly output images to the display image generated in the image thinning-out procedure to increase the rate of the display image so that the rate of the display image is made equal to the display rate; and code for a display procedure of displaying the image whose rate is converted in the rate conversion procedure on the display apparatus.

* * * * *